Figure 1:
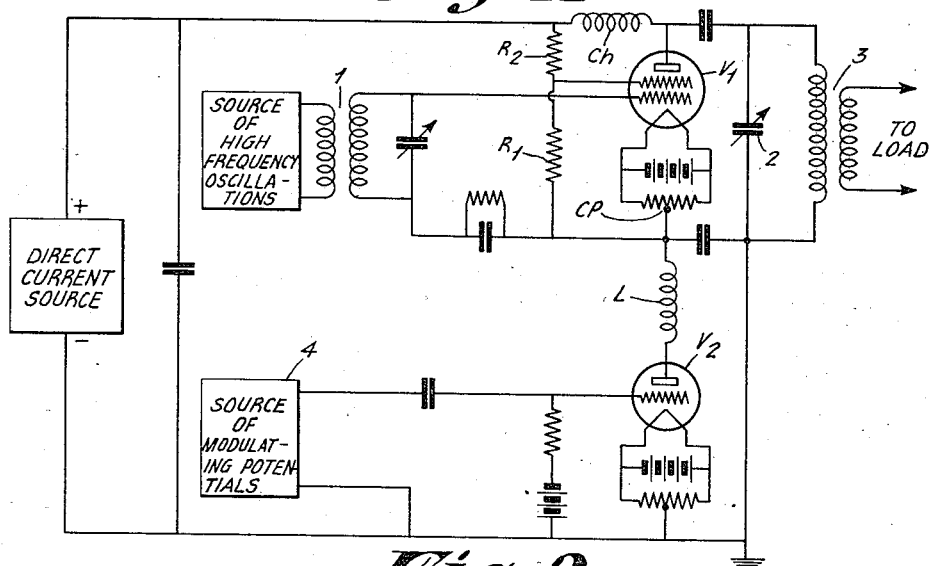

March 24, 1936.  W. T. DITCHAM  2,034,899

MODULATED TRANSMITTER

Filed July 8, 1933

INVENTOR
WILLIAM T. DITCHAM
BY
ATTORNEY

Patented Mar. 24, 1936

2,034,899

UNITED STATES PATENT OFFICE 2,034,899

MODULATED TRANSMITTER

William Theodore Ditcham, Chelmsford, England, assignor to Radio Corporation of America, a corporation of Delaware Application July 8, 1933, Serial No. 679,471
In Great Britain July 28, 1932

4 Claims. (Cl. 179—171)

This invention relates to radio and other modulated carrier wave transmitters and more particularly to transmitters of the kind wherein modulation is effected by the so-called "series modulation" method. In this method there is employed a valve to be hereinafter referred to as a "modulated" valve to whose input terminals high frequency oscillations are applied and which is connected in series, i. e. has its anode-cathode space in series, with the anode-cathode space of a modulating valve to whose input terminals the modulating potentials are applied.

The invention has for its object to provide a transmitter of the kind referred to which shall be efficient in operation and present the advantages of a satisfactory frequency response and close approximation to rectilinearity together with the advantages of low internal capacity and high amplification.

According to this invention a transmitter of the kind referred to comprises a valve having more than one grid and serving as a modulated valve and a positive bias potential is applied to the grid between the control grid and the anode, this bias potential being obtained either from a series resistance connected to the anode voltage supply for the modulated valve or from a potentiometer whose resistance is connected between the anode and cathode of said modulated valve. In this way the response of the modulated valve to modulating voltages is caused to remain substantially rectilinear even with a high degree of modulation, and owing to the use of a valve having an extra grid between the control grid and the anode, high amplification and low internal capacity are obtained.

In carrying out the present invention the modulated valve may be constituted by a tetrode or so-called "screened grid" valve, or, if desired, more than one tetrode may be employed; for example, there may be two tetrodes connected in parallel or alternatively in phase opposition in a so-called "push-pull" circuit. Where parallel valves are employed, it may be found advantageous to associate the normal oscillatory circuit in parallel with the tetrodes through suitable coupling condensers, each coupling the said oscillatory circuit either to the anode or to the cathode point. With this arrangement the oscillatory circuit can be earthed. Alternatively, in place of employing capacity coupling between the tetrodes and the oscillatory circuit, inductive coupling may be resorted to, the oscillatory circuit being inductively coupled to a winding connected in series with the anode circuit of the parallel connected tetrodes. This arrangement also permits of earthing the oscillatory circuit. Where tetrodes in phase opposition or push-pull are employed, it may be of advantage to dispense with any connection between the push-pull oscillatory circuit and the cathode point.

Cathode heating for the modulated valve or valves can be obtained, for example, from energy derived from an insulated transformer fed with alternating current of a frequency below or above the limits of audibility, or cathode energization may be obtained from a suitably insulated direct current machine or again a rectifying device energized from an alternating current source, may be employed. The modulated valve or valves may be the indirectly heated cathode type or may be the directly heated filament type.

The invention is of general application for modulated continuous wave transmission. Where the invention is employed for the transmission of telegraphic signals on continuous waves "keying" may conveniently be accomplished by varying the bias on the grid of the modulating valve from one fixed value to another so as to obtain "marking" and "spacing" periods.

Figure 2:
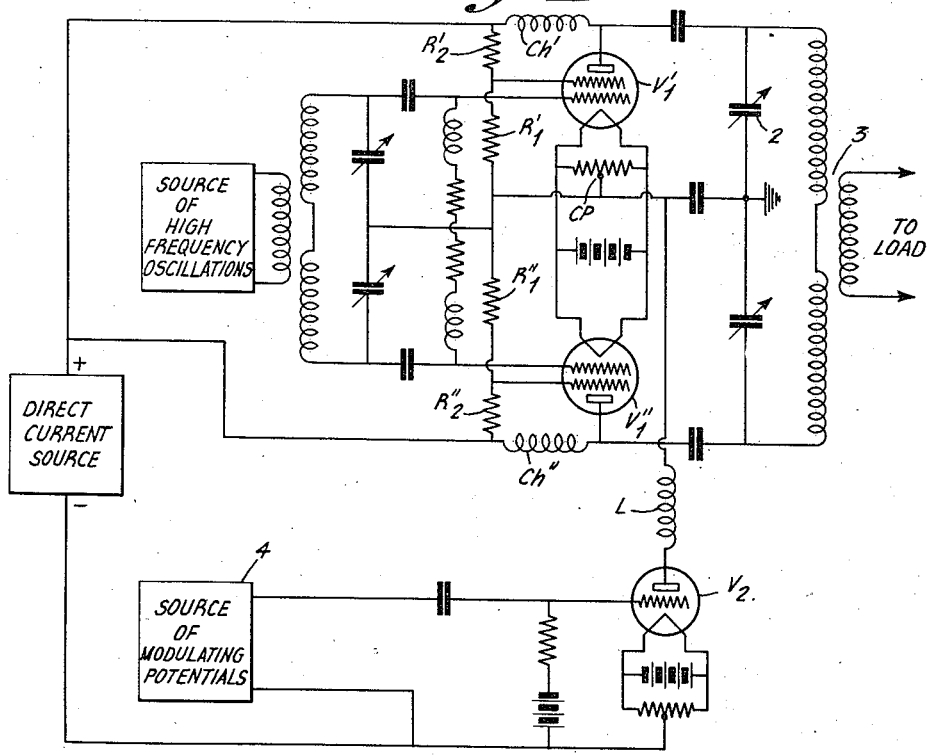

The invention is illustrated in the accompanying diagrammatic drawing in which Figure 1 is a circuit diagram illustrating the essential elements of a modulating system arranged in accordance with the present invention, while Figure 2 is a modification of the arrangement of Figure 1.

Referring to Figure 1, a source of high frequencies to be modulated is applied via a coupling 1 to the grid circuit of a modulated valve $V_1$ of the tetrode type, the said grid circuit comprising the usual tuned circuit in series with a condenser shunted high resistance. The outer grid of the tetrode $V_1$ is connected to the effective cathode point through a resistance $R_1$ and also through a resistance $R_2$ to the positive terminal of the source of anode potential. The anode circuit of the valve $V_1$ is capacity coupled to an oscillatory circuit 2, and output is taken off via coupling 3. $Ch$ is a choke between the anode of the valve $V_1$ and the positive terminal of the source of anode potential. The cathode of the valve $V_1$ is heated as indicated and is shunted by a resistance whose center point CP constitutes the effective cathode point of the valve $V_1$ and is connected through an inductance L to the anode of the modulating valve $V_2$. The valve $V_2$ is a triode and as will be seen its anode-cathode space is in series with the valve $V_1$ across the terminals of the anode potential source. Modulating potentials are applied to the grid at 4 and the cathode point of the valve V₂ is connected to the negative terminal of the source of anode potential, the said cathode point being constituted in similar manner to that in which the cathode point of the valve V₁ is constituted.

In the modification shown in Figure 2 the modulated stage consists of two tetrodes V₁' and V₁'' in push-pull, these tetrodes having a common cathode point CP and receive upon their control grids oscillations to be modulated, the oscillations being fed thereto in push-pull as indicated. The common cathode point is connected to the two outer grids of the two valves V₁' and V₁'' via the resistances R₁' and R₁'' and the said outer grids are also connected to the positive terminal of the source through resistances R₂'R₂''. Ch' and Ch'' are chokes corresponding to the chokes Ch of Figure 1. The tuned output circuit 2' is slightly modified in manner well known per se to be adapted for the push pull method. The modulating triode V₂ is arranged in a manner closely analogous to that shown in Figure 1, the anode of this triode being connected to the common cathode point CP through the choke L.

Having thus described my invention and the operation thereof, what I claim is:

1. A signalling circuit comprising, a thermionic amplifier tube having a cathode, an anode and a control grid, a source of carrier waves connected with said control grid and cathode, an output circuit connected between said anode and cathode, means for modulating the carrier waves in said tube at signal frequency comprising a modulating tube having its control grid energized at signal frequency and its anode to cathode impedance connected in series with the anode to cathode impedance of said first named tube and with a source of direct current, and means for insuring linear modulation of the carrier wave irrespective of the percentage modulation and for preventing reaction between the control grid and anode circuits of said first named tube including a screen like electrode in said amplifier tube between said anode and control grid, a potentiometer resistance in shunt with the anode to cathode impedance of said amplifier tube, and a connection between a point of positive potential on said potentiometer resistance and said screen like electrode.

2. In a signaling system, a thermionic tube having a cathode, an anode and a control grid, a circuit connected with the control grid and cathode of said tube for applying carrier waves to be modulated thereto, means for modulating the carrier waves in said tube comprising a second tube having its anode to cathode impedance connected in series with the anode to cathode impedance of said first named tube and with a source of direct current, and means for insuring linear modulation of the carrier wave irrespective of the percentage modulation and for preventing reaction between the control grid and anode circuits of said first named tube including a screen-like electrode in said first tube between said anode and control grid, an impedance connecting said screen-like electrode to the cathode of said first named tube, and an impedance connecting said screen-like electrode to the anode in said first named tube.

3. In a signaling system a pair of thermionic amplifier tubes each having an anode, a cathode and a control grid, circuits for applying oscillations to be modulated to the control grids and cathodes of said tubes, an alternating current circuit connected between the anodes of said tubes and to the cathodes of said tubes, a modulator tube, a source of direct current potential, circuits connecting the impedance of said modulator tube in series with the anode to cathode impedance of each of said first named tubes by way of said source of direct current potential, means for insuring linear modulation of the oscillations in said first named tubes comprising a screen-like electrode in each of said tubes between the anode and cathode thereof, impedances connecting each of said screen-like electrodes to the anode of the tube in which it is located and impedances connecting said screen-like electrodes together and to the cathodes of the tubes of said pair of tubes.

4. An arrangement as recited in claim 3 in which said alternating current circuit is symmetrically grounded.

WILLIAM THEODORE DITCHAM.